(12) United States Patent
Wolf

(10) Patent No.: US 9,041,719 B2
(45) Date of Patent: May 26, 2015

(54) METHOD AND SYSTEM FOR TRANSPARENTLY DIRECTING GRAPHICS PROCESSING TO A GRAPHICAL PROCESSING UNIT (GPU) OF A MULTI-GPU SYSTEM

(75) Inventor: Andreas Wolf, San Jose, CA (US)

(73) Assignee: NVIDIA CORPORATION, Santa Clara, CA (US)

( * ) Notice: Subject to any disclaimer, the term of this patent is extended or adjusted under 35 U.S.C. 154(b) by 1303 days.

(21) Appl. No.: 12/630,541

(22) Filed: Dec. 3, 2009

(65) Prior Publication Data

US 2011/0134132 A1      Jun. 9, 2011

(51) Int. Cl.
  *G06F 15/16*    (2006.01)
  *G09G 5/36*    (2006.01)
  *G06F 9/50*    (2006.01)
  *G06F 3/14*    (2006.01)

(52) U.S. Cl.
  CPC ............ *G06F 9/5027* (2013.01); *G06F 3/1423* (2013.01); *G06F 3/1454* (2013.01); *G09G 5/363* (2013.01); *G09G 2360/02* (2013.01); *G09G 2360/06* (2013.01); *G09G 2370/022* (2013.01)

(58) Field of Classification Search
  None
  See application file for complete search history.

(56) References Cited

U.S. PATENT DOCUMENTS

| | | | |
|---|---|---|---|
| 6,664,968 B2 | 12/2003 | Ono | |
| 7,075,541 B2 | 7/2006 | Diard | |
| 7,401,116 B1 * | 7/2008 | Chalfin et al. | 709/203 |
| 7,830,388 B1 * | 11/2010 | Lu | 345/501 |
| 7,969,444 B1 * | 6/2011 | Biermann et al. | 345/502 |
| 8,203,557 B2 | 6/2012 | Shah et al. | |
| 8,243,082 B1 | 8/2012 | Wyatt et al. | |
| 8,284,207 B2 * | 10/2012 | Bakalash et al. | 345/505 |
| 8,373,707 B1 | 2/2013 | Wyatt et al. | |
| 8,558,839 B1 | 10/2013 | Wyatt | |
| 2002/0118199 A1 | 8/2002 | Mukherjee et al. | |
| 2007/0257935 A1 | 11/2007 | Koduri et al. | |
| 2007/0268296 A1 | 11/2007 | Ledebohm et al. | |
| 2008/0211816 A1 * | 9/2008 | Gonzalez et al. | 345/505 |
| 2010/0039436 A1 * | 2/2010 | Krishna et al. | 345/522 |
| 2010/0302141 A1 | 12/2010 | Shankar et al. | |
| 2011/0060924 A1 | 3/2011 | Khodorkovsky | |
| 2011/0157193 A1 | 6/2011 | Boucher et al. | |
| 2014/0132612 A1 | 5/2014 | Schulze et al. | |

* cited by examiner

*Primary Examiner* — Ryan R Yang

(57) ABSTRACT

A method for transparently directing data in a multi-GPU system. A driver application receives a first plurality of graphics commands from a first graphics application and selects a first GPU from the multi-GPU system to exclusively process the first plurality of graphics commands. The first plurality of graphics commands is transmitted to the first GPU for processing and producing a first plurality of renderable data. The first plurality of renderable data is stored in a first frame buffer associated with the first GPU. A second plurality of graphics commands is received from a second graphics application and a second GPU is selected to exclusively process the second plurality of graphics commands. The second GPU processing the second plurality of graphics commands produces a second plurality of renderable data. The second plurality of renderable data is stored in a second frame buffer associated with the second GPU.

19 Claims, 5 Drawing Sheets

METHOD AND SYSTEM FOR TRANSPARENTLY DIRECTING GRAPHICS PROCESSING TO A GRAPHICAL PROCESSING UNIT (GPU) OF A MULTI-GPU SYSTEM

TECHNICAL FIELD

The embodiments of the present invention relate to transparently directing graphics processing work to a graphical processing unit (GPU) of a multi-GPU system.

BACKGROUND ART

Multi-GPU systems have become prevalent in the industry. In general, multi-GPU systems may be used to accelerate processing of graphical applications.

One conventional system uses a multi-GPU system to accelerate processing of a single graphics application. For example, a display driver may be configured to redirect a 3D application programming interface (API) workload to the multi-GPU system in either per frame alternating pattern or intra-frame alternating pattern or a mixture of the two. In this case, different frames of the graphics application may be assigned to different GPUs to increase performance.

Unfortunately using a multi-GPU system to accelerate processing of a single graphical application according to the above conventional system consumes all available GPU resources of the multi-GPU system. As a result, no additional graphics application may utilize the resources of the multi-GPU during the time which the single graphical application is utilizing the multi-GPU system. Alternatively, running an additional graphical application simultaneously with the single graphical application may be allowed but will degrade the overall performance because the available resources of the multi-GPU system will be time shared between the multiple graphics applications.

Other conventional systems have been developed to utilize a multi-GPU system in order to accelerate processing of graphical applications. For example, a graphics application may use a special middleware graphical library to split up its command stream for transmission to an appropriate GPU of the multi-GPU system for processing.

Unfortunately, a graphics application that directs its command stream to a particular GPU needs to be aware of this GPU assignment and will fail to work retroactively for existing graphical applications that are otherwise unaware of any particular GPU assignment. For example, existing graphics applications have to be rewritten in order to take advantage of directing their command stream to an enumerated GPU. In other words, a rewrite and recompilation of a graphical application is required to leverage a multi-GPU system in order to improve performance of multiple graphical applications operating simultaneously in this convention method.

SUMMARY

Accordingly, a need has arisen to accelerate processing of multiple graphics applications simultaneously in a multi-GPU system. Moreover, a need has arisen to accelerate processing of multiple applications in a multi-GPU system without a need to rewrite the graphics applications. A need has arisen to simultaneously operate a plurality of graphics applications on a multi-GPU system with no reduction of processing performance measurable by the user. It will become apparent to those skilled in the art after reading the detailed description of the present invention that the embodiments of the present invention satisfy the above mentioned needs.

A multi-GPU system or "server" according to one embodiment of the present invention may include a central processing unit (CPU) running an operating system, a plurality of graphical processing units (GPUs), and a memory component. The memory component may store a plurality of graphics applications, e.g., a first graphics application, a second graphics application, operating system, a driver application, etc. Each GPU includes its own respective frame buffer memory.

According to one embodiment of the present invention the driver application implements a method executed by the CPU. The driver application accelerates processing of multiple graphical applications on a multi-GPU system in a manner that is transparent to the graphics applications. According to one embodiment, the driver application receives a first plurality of graphics commands from a first graphics application. The driver application selects a first graphical processing unit (GPU) from the plurality of GPUs. Selecting the first GPU associates the first GPU to process the first plurality of graphics commands exclusively.

The driver application transmits the first plurality of graphics commands to the first GPU. The first GPU processes the plurality of graphics commands and produces a first plurality of renderable data. The first plurality of renderable data is stored in a first frame buffer. The first frame buffer is associated with the first GPU.

According to one embodiment, after the selection of the first GPU, the driver application may receive a second plurality of graphics commands from the first graphics application. The driver application transmits the second plurality of graphics commands to the first GPU for processing. The first GPU processes the second plurality of graphics commands and produces a second plurality of renderable data. The second plurality of renderable data is stored in the first frame buffer associated with the first GPU.

According to one embodiment, the driver application may receive a third plurality of graphics commands from a second graphics application. The driver application selects a second graphical processing unit (GPU) from the plurality of GPUs to exclusively process the third plurality of graphics commands. The third plurality of graphics commands is transmitted to the second GPU for processing. The second GPU produces a third plurality of renderable data. The third plurality of renderable data is stored in a second frame buffer. The second frame buffer is associated with the second GPU.

It is appreciated that according to one embodiment, the first graphics application is launched by a first remote client. Furthermore, it is appreciated that the second graphics application may be launched by a second remote client. The first, the second, and the third plurality of renderable data stored in their respective frame buffers may be rendered by a display.

According to one embodiment, GPU selection, transmission of graphics commands to the selected GPU, and storage of the content resulting from the processed graphics commands in a frame buffer associated with the selected GPU occur transparent to the graphics application, e.g., the first and the second graphics applications. The GPU selection may be based on a plurality of heuristics, e.g., bottleneck, utilization of GPUs, GPU speed, type of graphics application, etc. It is appreciated that the GPU selection may be based on the first available GPU and it may occur in a round robin fashion.

According to embodiments of the present invention, each graphics application is transparently assigned to a dedicated GPU for processing graphics commands of that particular graphics application. The driver performs this assignment.

Thus, multiple graphics applications may be launched and operated simultaneously without degradation in graphics performance as long as the number of graphics applications operating is less than or equal to the number of GPUs available in the system. Furthermore, acceleration in processing is achieved without a need to rewrite graphics applications and occurs transparent to the graphics applications.

In one embodiment, the multi-GPU system may be coupled to a single display screen and user interface, e.g., a desktop system. In such a system, one GPU and frame buffer are used to control display to the screen. In such system, one of the frame buffers may be referred to as a "master" which the other GPU frame buffers are referenced to as "slaves." In such a desktop system, data from a slave buffer is copied into the master frame buffer in order to render the data for display.

In the case of a remote GPU server system, no single display connection exists. Instead, several remote displays are connected. In this case, there is no distinction between "slave" and "master" GPU frame buffers.

BRIEF DESCRIPTION OF THE DRAWINGS

Embodiments of the present invention are illustrated by way of example, and not by way of limitation, in the figures of the accompanying drawings and in which like reference numerals refer to similar elements and in which.

DETAILED DESCRIPTION

Figure 1:
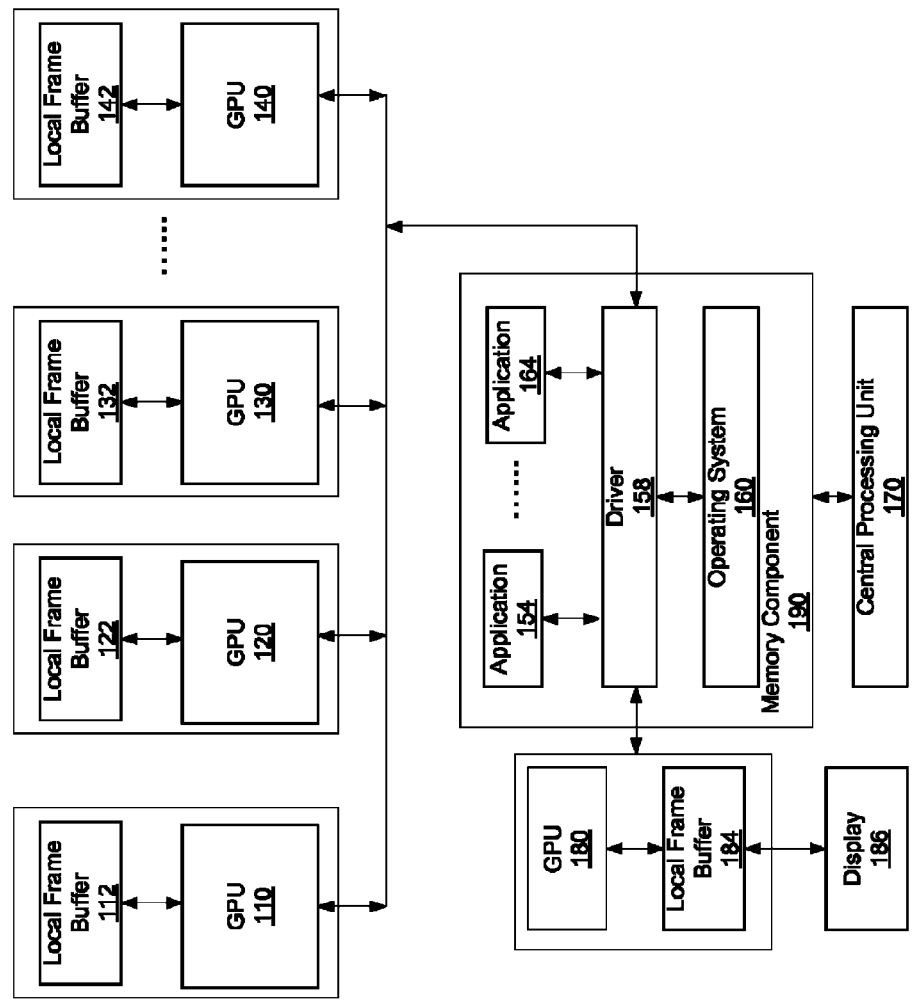
FIG. 1 shows a desktop multi-GPU system in accordance with one embodiment of the present invention.

Reference will now be made in detail to embodiments of the present invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be evident to one of ordinary skill in the art that the present invention may be practiced without these specific details. In other instances, well known methods, procedures, components, and circuits have not been described in detail as not to unnecessarily obscure aspects of the invention.

Notation and Nomenclature

Some portions of the detailed descriptions which follow are presented in terms of procedures, steps, logic blocks, processing, and other symbolic representations of operations on data bits that can be performed on computer memory. These descriptions and representations are the means used by those skilled in the art to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities.

Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "creating" or "transferring" or "executing" or "determining" or "instructing" or "issuing" or "clearing" or "accessing" or "obtaining" or "selecting" or "calculating" or "measuring" or "querying" or "receiving" or "sending" or "providing" or "storing" or "incrementing" or "ordering" or "transmitting" or "computing" or "performing" or "converting" or "displaying" or "rendering" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Method and System for Transparently Directing Graphics Processing to a Graphical Processing Unit (GPU) of a Multi-GPU System Referring to FIG. 1, a multi-GPU system 100 in accordance with one embodiment of the present invention is shown. The system 100 includes multiple independent GPUs where multiple graphics applications may be launched and operated simultaneously without causing performance degradation. Data processing associated with graphics applications is accelerated without a need to rewrite the graphics applications. In other words, acceleration in graphics processing occurs transparent to the graphics applications.

The system 100 includes a main or "master" GPU 180 associated with a local frame buffer 184. The system 100 further includes a memory component 190 for storing computer instructions thereon, e.g., graphics applications 154, 164, etc., driver 158, operating system 160, etc. The computer instructions are executed by a central processing unit 170. The system 100 further includes a plurality of "slave" GPUs, e.g., GPU 110, 120, 130, 140, etc., that have local frame buffers associated therewith, e.g., local frame buffer 112, 122, 132, 142, etc. According to one embodiment, the system 100 further includes a display 186 to render graphics and data. This embodiment of the multi-GPU system may be referred to as a "desktop system."

According to one embodiment, the graphics application 154 is launched. The graphics application 154 transmits a plurality of graphics commands to the driver 158.

The driver 158 automatically selects an appropriate vacant or idle GPU, e.g., GPU 110, from the plurality of GPUs 110, 120, 130, and 140. The selection of GPU 110 by the driver 158 dedicates GPU 110 to exclusively process information and graphics commands from the graphics application 154. Therefore, the selected GPU is no longer idle.

It is appreciated that the selection process may be based on a plurality of heuristics. For example, the selection may be based on the amount of resources available for each GPU, idle time of GPUs, first available GPU, bottleneck conditions and utilization conditions of GPUs, etc. It is appreciated that in one embodiment, the GPU is selected based on a first available GPU. In this case type, the selection process may occur in a round robin fashion.

The graphics commands from the graphics application 154 are transmitted by the driver 158 to the selected GPU 110. The GPU 110 processes the graphics commands and produces a plurality of renderable data. The plurality of renderable data is data operable to be rendered by a device, e.g., display. The plurality of renderable data is stored in the local frame buffer 112 that is associated with the selected GPU 110. It is appreciated that the selected GPU 110 may be dedicated to the graphics application 154 by driver 158 as long as the graphics application 154 is operating. Thus, the additional graphics commands issued by the graphics application 154 may be transmitted to the selected GPU 110 via the driver 158 without the need to go through the selection process again.

It is appreciated that the plurality of renderable data stored in the frame buffer 112 may be fed copied to master frame buffer area 184 hosted by the main GPU 180 for display to display 186. For example, the plurality of renderable data stored in the frame buffer 112 may be transmitted to the frame buffer 184 via a peer to peer frame buffer blits. The display 186 may access the plurality of renderable data stored in the frame buffer 184 to display content associated with the graphics application 154. An analogous frame buffer copy can be done by any of the frame buffers 112, 122, 132, or 142 to master frame buffer 184 for display to display 186.

It is appreciated that one or more additional graphics applications, e.g., 164, may be launched while graphics application 154 is operating. The sequence of events following the launch of the graphics application 164 is similar to that of graphics application 154. For example, the driver 158 receives the graphics commands associated with the graphics application 164. The driver 158 automatically selects a GPU, e.g., GPU 130, to process the graphics commands from the graphics application 164. The selection of GPU 130 by the driver 158 dedicates GPU 130 to exclusively process information and graphics commands from graphics application 164.

The graphics commands from the graphics application 164 are transmitted by the driver 158 to the selected GPU 130. The GPU 130 processes the graphics commands and produces a plurality of renderable data associated with the graphics application 164. The plurality of renderable data associated with the graphics application 164 is stored in the local frame buffer 132 that is associated with the GPU 130. It is appreciated that the selected GPU 130 may be dedicated to the graphics application 164 as long as the graphics application 164 is operating. Thus, additional graphics commands issued by the graphics application 164 may be transmitted to the selected GPU 130 via the driver 158 without the need to go through the selection process again.

It is appreciated that the plurality of renderable data stored in the frame buffer 132 may be copied to master frame buffer area 184 hosted by the main GPU 180 for display to display 186. For example, the plurality of renderable data stored in the frame buffer 132 may be transmitted to the frame buffer 184 via a peer to peer frame buffer blits. The display 186 may access the plurality of renderable data stored in the frame buffer 184 to display content associated with the graphics application 164.

In this environment, because each graphics application is assigned its own GPU and frame buffer pair, there is no performance degradation of the display 186, even though both graphics applications are simultaneously active.

It is appreciated that graphics applications, e.g., 154, 164, etc., are unaware of their particular GPU assignment within the multi-GPU system. Thus, for all intended purposes the graphics applications 154, 164, etc., are unaware of their graphics commands being processed by different GPUs of the multi-GPU system, e.g., GPU 110, 120, 130, 140, etc., instead of the main GPU 180.

Accordingly, the selection of a GPU from the multi-GPU system, transmission of graphics commands by the driver to the selected GPU, generation of renderable data by the selected GPU, storage of renderable data in the frame buffer associated with the selected GPU, and transmission of renderable data to the local frame buffer 184 associated with the main GPU 180 occur transparent to the graphics applications. Thus, there is no need to rewrite a graphics application to include dedicated code for selecting particular GPUS to leverage a multi-GPU system. Furthermore, dedicating a respective GPU to each graphics application ensures that launching of an additional graphics application would not degrade the graphics performance of operating applications as long as the number of previously launched graphics applications is less than the number of GPUs.

Figure 2:
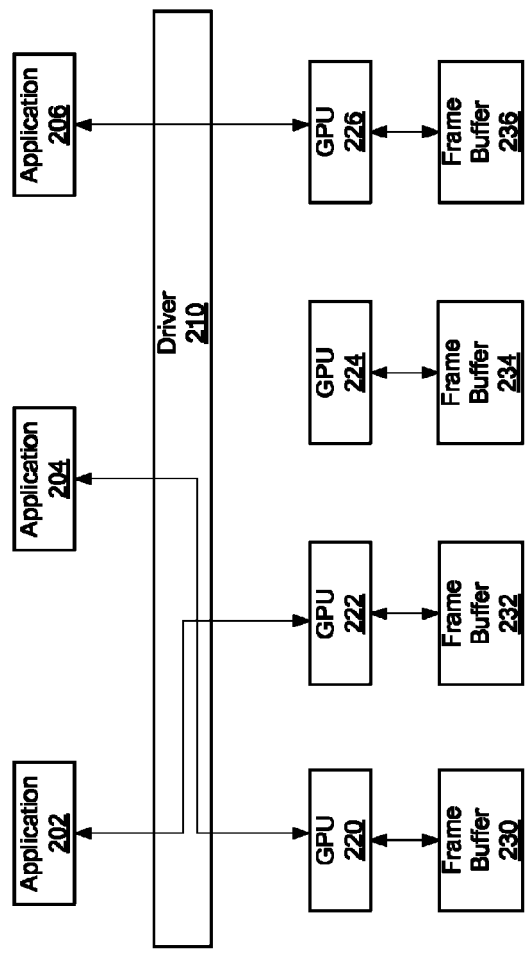
FIG. 2 shows a server in accordance with one embodiment of the present invention.

FIG. 2 shows a multi-GPU server 200 in accordance with one embodiment of the present invention. The server 200 operates substantially similar to that of FIG. 1 except there is a "local" display. The server includes a plurality of GPUs, e.g., GPUs 220, 222, 224, and 226. Each GPU has a corresponding frame buffer, e.g., frame buffers 230, 232, 234, and 236. The server further includes a driver application 210 that is operable to host a plurality of graphics applications, e.g., applications 202, 204, and 206.

The driver application 210 operates substantially similar to the driver 158 described with respect to FIG. 1. For example, the driver 210 receives a plurality of graphics commands when a graphics application, e.g., application 202, is launched. The driver 210 automatically selects an appropriate idle GPU to exclusively process the graphics commands from the graphics application 202. For example, the driver 210 may select GPU 222 to exclusively process the graphics commands from graphics application 202. It is appreciated that the selection may be based on a plurality of heuristics, as described above with respect to FIG. 1.

The driver 210 transmits the graphics commands of the graphics application 202 to the GPU 222 for processing. The GPU 222 processes the graphics commands to produce a plurality of renderable data associated with the graphics application 202. The plurality of renderable data may be stored in the frame buffer 232 that is associated with the GPU 222. The plurality of renderable data may be transmitted from the frame buffer 232 to a remote display such that the renderable data can be displayed.

It is appreciated that an additional graphics application, e.g., application 204, may be launched while the graphics application 202 is operating. The driver 210 receives the graphics commands associated with the graphics application 204. The driver 210 automatically selects an appropriate GPU, e.g., GPU 220, to process the graphics commands from the graphics application 204. The driver 210 transmits the graphics commands associated with the graphics application 204 to the selected GPU 220. The GPU 220 processes the graphics commands associated with the graphics application 204 to produce a plurality of renderable data. The plurality of renderable data is stored in the frame buffer 230 that is associated with the GPU 220. The stored information in the frame buffer 230 may be accessed in order to transfer the content to a renderable device, e.g., display, for rendering.

It is appreciated that the driver 210 similarly operates to accommodate an additional graphics application, e.g., application 206. For example, the driver 210 selects GPU 226 to exclusively process graphics commands from the graphics application 206. The graphics commands associated with the graphics application 206 are similarly transmitted by the driver 210 to the GPU 226 and processed to produce a plurality of renderable data. The plurality of renderable data is stored in the frame buffer 236 associated with the GPU 226.

It is appreciated that in this exemplary embodiment, the number of graphics applications operating is less than the number of available GPUs. Thus, GPU 224 is idle and awaits a launch of a graphics application. Alternatively, the GPU 224 may assist a currently operating GPU in processing one of the graphics applications, e.g., applications 202, 204, or 206, until a new application is launched.

Figure 3:
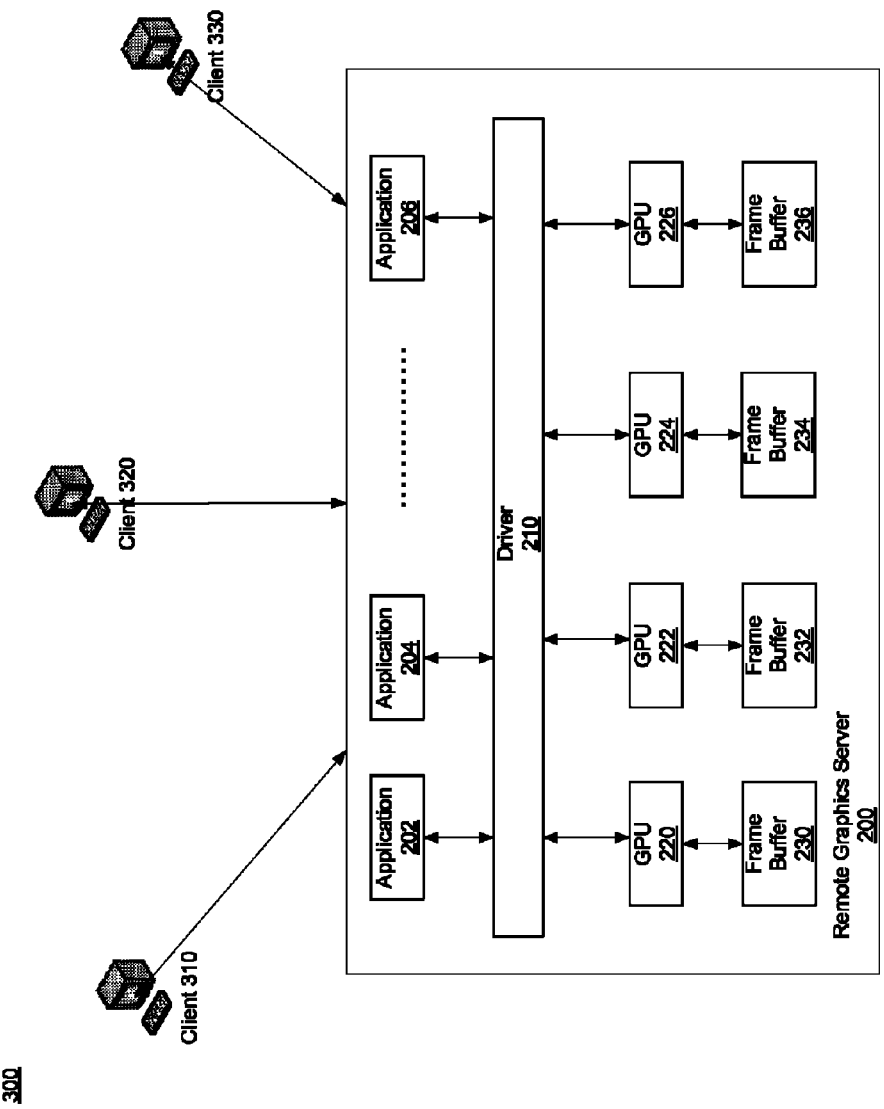
FIG. 3 shows a remote multi-GPU system server in accordance with one embodiment of the present invention.

FIG. 3 shows a remote multi-GPU system 300 in accordance with one embodiment of the present invention. The remote system 300 includes the server 200 as described above. The system 300 includes a plurality of clients, e.g., clients 310, 320, and 330. It is appreciated that applications 202, 204 and 206 may be launched by clients 310, 320, and 330 respectively. It is appreciated that in one embodiment, more than one graphics application may be launched by a given client. For example, graphics applications 202 and 204 may be launched by client 310 while graphics application 206 may be launched by client 330.

It is appreciated that renderable data stored in the frame buffers of the server 200 may be transmitted to the respective clients for rendering. For example, the content stored in the frame buffer 230 may be transmitted to the client 310 for rendering and for display. Each client is assigned to one respective frame buffer.

Figure 4A:
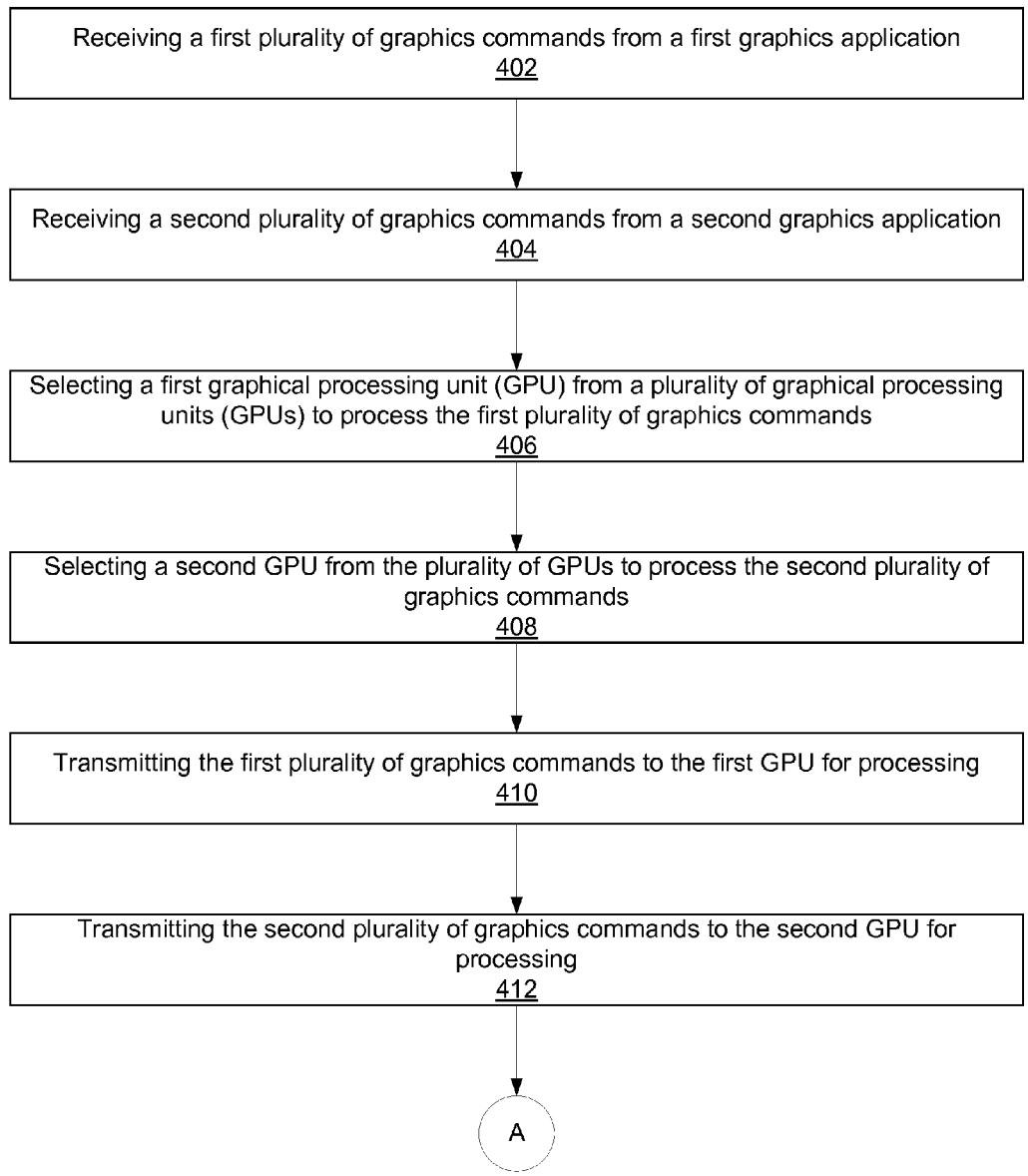
FIGS. 4A and 4B show an exemplary flow diagram in accordance with one embodiment of the present invention.
Figure 4B:
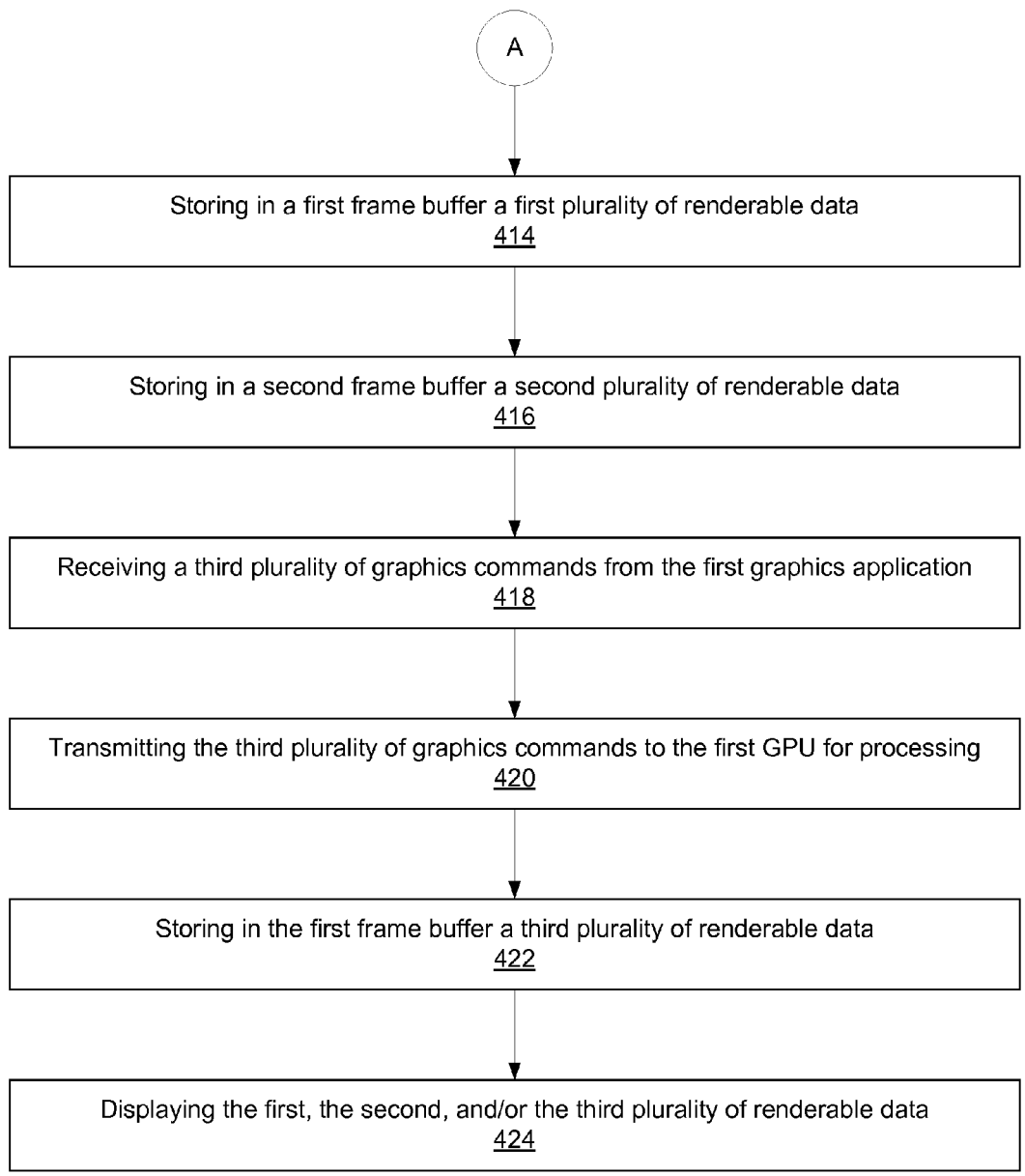

FIGS. 4A and 4B show an exemplary flow diagram 400 in accordance with one embodiment of the present invention. The flow diagram 400 illustrates a driver implemented method. The memory component 190 may store information and instructions associated with the driver application that when executed by the processor, e.g., the central processing unit 170, accelerates data processing associated with graphics applications. GPU assignment to the application by the driver application occurs transparent with respect to the graphics application. The memory component 190 may be a random access memory (RAM), dynamic storage device, a read only memory (ROM), a non-volatile storage device such as a magnetic disk or optical disk, etc. The term "computer-readable medium" as used herein refers to any medium that participates in providing instructions to processor, e.g., central processing unit 170 for execution.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

At step 402, the driver application receives a first plurality of graphics commands from a first graphics application that is launched concurrently. For example, the first plurality of graphics commands may be initiated when the first graphics application is launched. At step 404, the driver application receives a second plurality of graphics commands from a second graphics application. For example, the second plurality of graphics commands may be initiated when the second graphics application is launched.

It is appreciated that the second graphics application may be launched and its respective graphics commands are received by the driver at any time. Thus, the receipt of the second plurality of graphics commands immediately after the first plurality of graphics commands is exemplary and not intended to limit the scope of the present invention. It is appreciated that the graphics application may be local to the user or may be launched remotely.

At step 406, the driver application automatically selects a first GPU from a plurality of idle GPUs to exclusively process the first plurality of graphical commands from the first graphics application. At step 408, the driver application automatically selects a second GPU from the plurality of idle GPUs to exclusively process the second plurality of graphical commands from the second graphics application. Once selected, a GPU is no longer idle.

It is appreciated that the automatic selection of a GPU to exclusively process the graphical commands from a given graphics application may be based on a plurality of heuristics. For example, the selection may be based on the amount of resources available for each GPU, idle time of GPUs, first available GPU, GPU utilization and bottleneck conditions, etc. It is appreciated that in one embodiment, the GPU is selected based on a first available GPU. Furthermore, the selection may occur in a round robin fashion.

At step 410, the first plurality of graphics commands associated with the first graphics application is transmitted or rerouted by the driver application to the first GPU. The first GPU processes the first plurality of graphics commands to produce a first plurality of renderable data. The plurality of renderable data is data operable to be rendered by a renderable device, e.g., a display. At step 412, the second plurality of graphics commands associated with the second graphics application is transmitted or rerouted by the driver application to the second GPU. The second GPU processes the second plurality of graphics commands to produce a second plurality of renderable data.

At step 414, the first plurality of renderable data is stored in a first frame buffer. It is appreciated that the first frame buffer is associated with the first GPU. It is further appreciated that the content stored in the first frame buffer may be transmitted from the first frame buffer to a main frame buffer associated with the main GPU of the system. At step 416, the second plurality of renderable data is stored in a second frame buffer. It is appreciated that the second frame buffer is associated with the second GPU. In one embodiment, the content stored in the first and the second frame buffers may be transferred to the "master" frame buffer.

At step 418, a third plurality of graphics commands is received from the first graphics application. The third plurality of graphics commands is received after the first plurality of graphics commands and after the driver application has selected the first GPU to process graphics commands associated with the first graphics application. Thus, at step 420, the third plurality of graphics commands is transmitted to the first GPU that has previously been selected and dedicated to process commands from the first graphics application.

The first GPU processes the third plurality of graphics commands to generate a third plurality of renderable data. The third plurality of renderable data is stored in the first frame buffer where the first frame buffer is associated with the first GPU, at step 422. The stored content of the frame buffers, e.g., the first frame buffer and/or the second frame buffer, may be transferred to a local frame buffer associated with the main GPU for rendering. At step 424, the first, the second, and/or the third plurality of renderable data may be rendered, e.g., displayed.

Although not shown in FIG. 4A or 4B, it is appreciated that upon termination of a graphics application, its associated GPU and frame buffer are returned to the pool of idle GPUs and can be reassigned to a different graphics application at a subsequent launch thereof.

Furthermore, in the case when a graphics application is launched and there are no idle GPUs remaining, the driver may time share a GPU between two or more graphics applications or may prevent the launching of the new graphics application. Prescribed user preferences can dictate the action taken and can also direct the driver in selecting a GPU for time sharing.

In accordance with embodiments of the present invention, the task of GPU selection from the multi-GPU system and a code to leverage the multi-GPU system is performed by the driver. Thus, GPU selection, transmission of graphics commands by the driver to the selected GPU, generation of renderable data by the selected GPU, storage of renderable data in the frame buffer associated with the selected GPU, and transmission of renderable data to the local frame buffer 184 associated with the main GPU 180 occur totally transparent to the graphics applications. Thus, the need to rewrite a graphics application to include dedicated code to leverage performance advantages of a multi-GPU system is eliminated. Furthermore, dedication of a respective GPU to each graphics application ensures that launching of additional graphics application does not degrade the individual performance of the operating applications as long as the number of previously launched graphics applications is less than the number of GPUs.

In the foregoing specification, embodiments of the invention have been described with reference to numerous specific details that may vary from implementation to implementation. Thus, the sole and exclusive indicator of what is, and is intended by the applicants to be, the invention is the set of claims that issue from this application, in the specific form in which such claims issue, including any subsequent correction. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising:
receiving a first plurality of graphics commands from a first graphics application;
receiving a second plurality of graphics commands from a second graphics application;
selecting a first graphical processing unit (GPU) and a second graphical processing unit (GPU) from a plurality of graphical processing units (GPUs), wherein said selecting comprises exclusively associating said first GPU to process said first plurality of graphics commands and said second GPU to process said second plurality of graphics commands;
transmitting said first plurality of graphics commands to said first GPU and said second plurality of graphics commands to said second GPU for processing, wherein said first GPU is operable to produce a first plurality of renderable data and said second GPU is operable to produce a second plurality of renderable data;
storing in a first frame buffer said first plurality of renderable data, wherein said first frame buffer is associated with said first GPU; and
storing in a second frame buffer said second plurality of renderable data, wherein said second frame buffer is associated with said second GPU,
wherein said exclusively associating is performed automatically in a driver, and transparently to said first and second graphics applications.

2. The method as described in claim 1 further comprising:
receiving a third plurality of graphics commands from said first graphics application, wherein said receiving said third plurality of graphics commands occurs after said selecting; and
transmitting said third plurality of graphics commands to said first GPU for processing, wherein said first GPU is operable to produce a third plurality of renderable data; and
storing in said first frame buffer said third plurality of renderable data.

3. The method as described in claim 1, wherein said first graphics application is launched by a first remote client, and wherein said second graphics application is launched by a second remote client.

4. The method as described in claim 1, wherein said selecting, said transmitting, and said storing occur transparent to said first graphics application.

5. The method as described in claim 1, wherein said selecting is based on a plurality of heuristics.

6. The method as described in claim 1, wherein said selecting is based on a first available GPU, and wherein said selecting occurs in a round robin fashion.

7. The method as described in claim 1 further comprising:
displaying said first plurality of renderable data on a display.

8. A method comprising:
receiving a first plurality of graphics commands from a first graphics application;
receiving a second plurality of graphics commands from a second graphics application;
selecting a first graphical processing unit (GPU) from a plurality of graphical processing units (GPUs), said selecting comprising exclusively associating with and processing said first plurality of graphics commands to produce a first plurality of renderable data;
selecting a second GPU from said plurality of GPUs to exclusively process said second plurality of graphics commands to produce a second plurality of renderable data;
storing in a first frame buffer said first plurality of renderable data, wherein said first frame buffer is associated with said first GPU; and
storing in a second frame buffer said second plurality of renderable data, wherein said second frame buffer is associated with said second GPU,
wherein said exclusively associating is performed automatically in a driver, and transparently to said first and second graphics applications.

9. The method as described in claim 8 further comprising:
rendering said first plurality of renderable data on a display; and
rendering said second plurality of renderable data on said display.

10. The method as described in claim 8 further comprising:
receiving a third plurality of graphics commands from said first graphics application, wherein said receiving said third plurality of data occurs after said selecting said first GPU; and
storing in said first frame buffer a third plurality of renderable data, wherein said third plurality of renderable data results from processing of said third plurality of graphics commands by said first GPU.

11. The method as described in claim 8, wherein said first graphics application is launched by a first remote client, and wherein said second graphics application is launched by a second remote client.

12. The method as described in claim 8, wherein said selecting said first and said second GPU is performed transparently to said first graphics application and said second graphics application respectively.

13. The method as described in claim 8, wherein said selecting said first and said second GPU is based on a plurality of heuristics.

14. The method as described in claim 8, wherein said selecting said first and said second GPU is performed in a round robin fashion.

15. A system comprising:
- a central processing unit operable to execute an operating system;
- a plurality of graphical processing units (GPUs) each GPU of said plurality of GPUs having associated therewith a respective frame buffer memory;
- a memory for storing a plurality of graphics applications, said operating system and a driver;
- wherein said driver is operable for automatically associating each of a plurality of launched graphics applications with a respective GPU of said plurality of GPUs, wherein a first GPU associated with a first launched graphics application is operable to perform solely graphics operations originating from said first launched graphics application, and wherein further said automatically associating is performed transparently to said graphics applications.

16. The system as described in claim 15 wherein each GPU is operable to store results in an associated respective frame buffer memory.

17. The system as described in claim 16 wherein a second GPU associated with a second launched graphics application is operable to perform solely graphics operations originating from said second launched graphics application.

18. The system as described in claim 17 wherein said driver is operable for automatically associating each of a plurality of launched graphics applications with a respective GPU of said plurality of GPUs based on a round-robin selection procedure of idle GPUs.

19. The system as described in claim 15 wherein said driver is executed by said central processing unit.

* * * * *